No. 801,856. PATENTED OCT. 17, 1905.
H. Y. B. DUFF.
METHOD OF MAKING GEAR RIMS.
APPLICATION FILED NOV. 3, 1904.

2 SHEETS—SHEET 1.

WITNESSES.
INVENTOR.

No. 801,856. PATENTED OCT. 17, 1905.
H. Y. B. DUFF.
METHOD OF MAKING GEAR RIMS.
APPLICATION FILED NOV. 3, 1904.

2 SHEETS—SHEET 2.

WITNESSES. INVENTOR.

UNITED STATES PATENT OFFICE.

HUGH Y. B. DUFF, OF ALLEGHENY, PENNSYLVANIA.

METHOD OF MAKING GEAR-RIMS.

No. 801,856.      Specification of Letters Patent.      Patented Oct. 17, 1905.

Application filed November 3, 1904. Serial No. 231,289.

*To all whom it may concern:*

Be it known that I, HUGH Y. B. DUFF, a resident of Allegheny, in the county of Allegheny and State of Pennsylvania, have invented a new and useful Improvement in Methods of Making Gear-Rims; and I do hereby declare the following to be a full, clear, and exact description thereof.

My invention relates to a method of making gear-wheels, and more especially removable and renewable toothed rims for such wheels.

The object of my invention is to provide a method whereby the toothed faces or rims on gear-wheels can be made much more quickly and cheaply than heretofore.

In the manufacture of gear-wheels as heretofore practiced they have been either cast to shape with the gear-teeth or else the gear-teeth have been cut on the circular periphery of the gear-wheel after casting or forging. Heretofore gear-wheels have been provided with removable and renewable toothed portions; but even these toothed portions have been made either by casting to shape or else by cutting the teeth in the curved or circular periphery thereof. By the casting process the gear-teeth cannot be formed true and smooth. For the better class of gears the practice always is to cut the teeth by means of suitable milling or gear-cutting machines. By reason of the curved periphery of the wheel it is not possible by any existing machinery to cut more than two or three teeth at one time, and as a consequence the cutting of the teeth is a slow and expensive process.

The object of my invention is to provide a method of making gear-rims whereby this slow and expensive manner of cutting the teeth is avoided.

To this end the invention consists, generally stated, in making the toothed rim portion separate from the body thereof and forming the same from a straight bar or section of a bar whereon all of the gear-teeth for the entire or any portion of the periphery of the wheel can be cut at a single operation and then bending said toothed bar to the contour of the wheel.

Figures 1, 2:
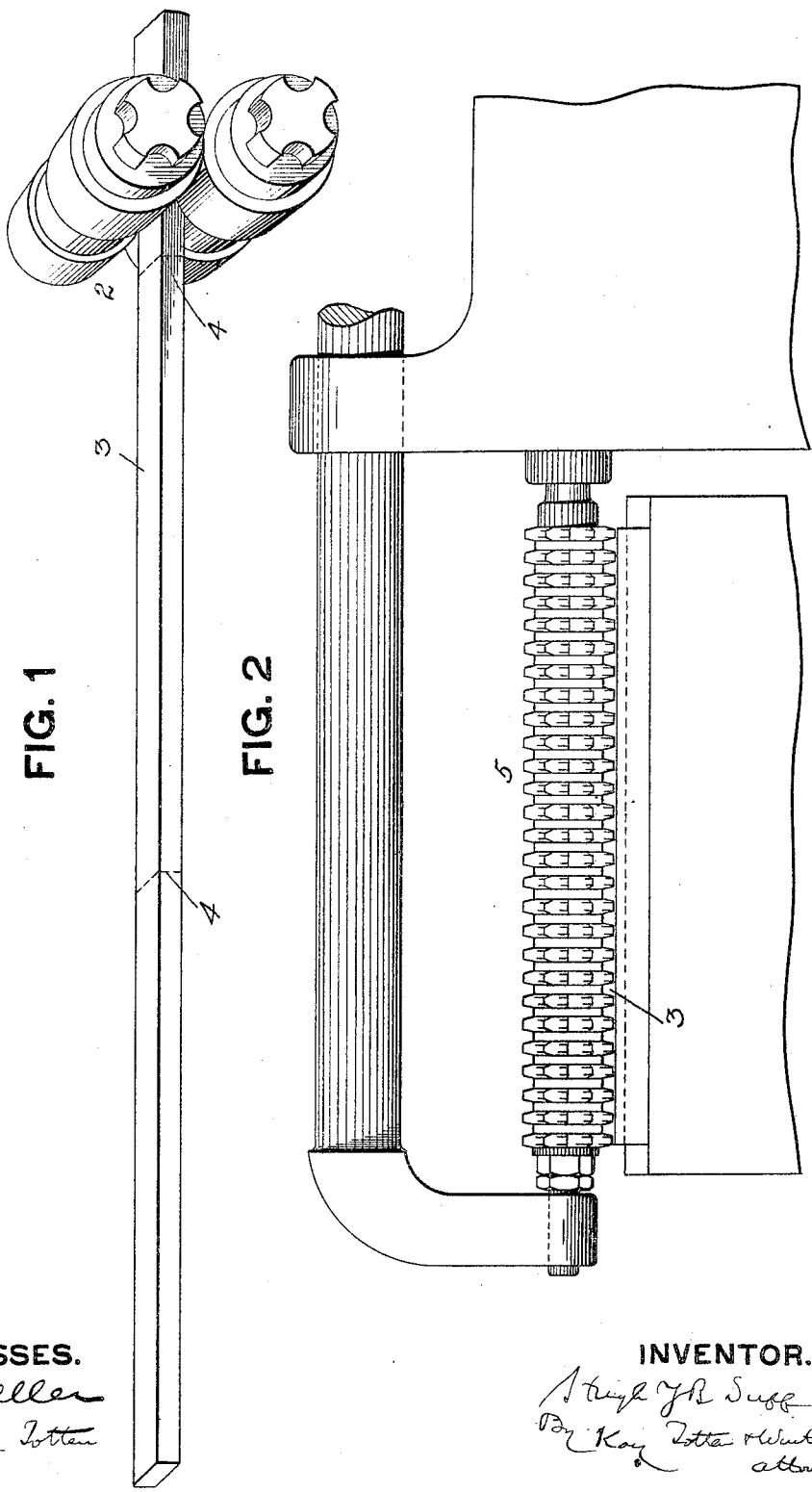
Figure 3:
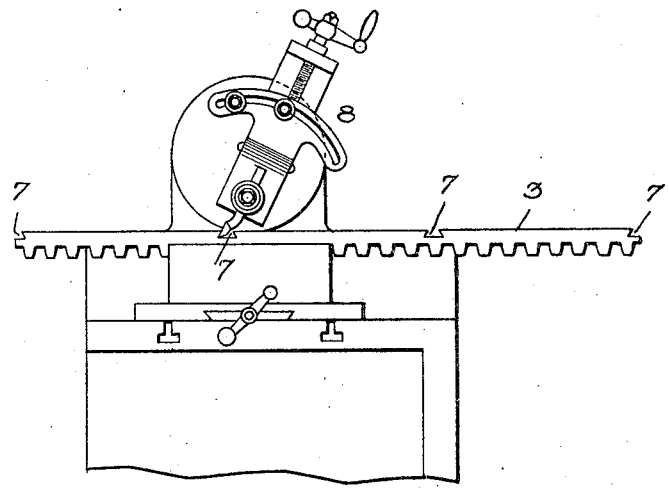
Figure 4:
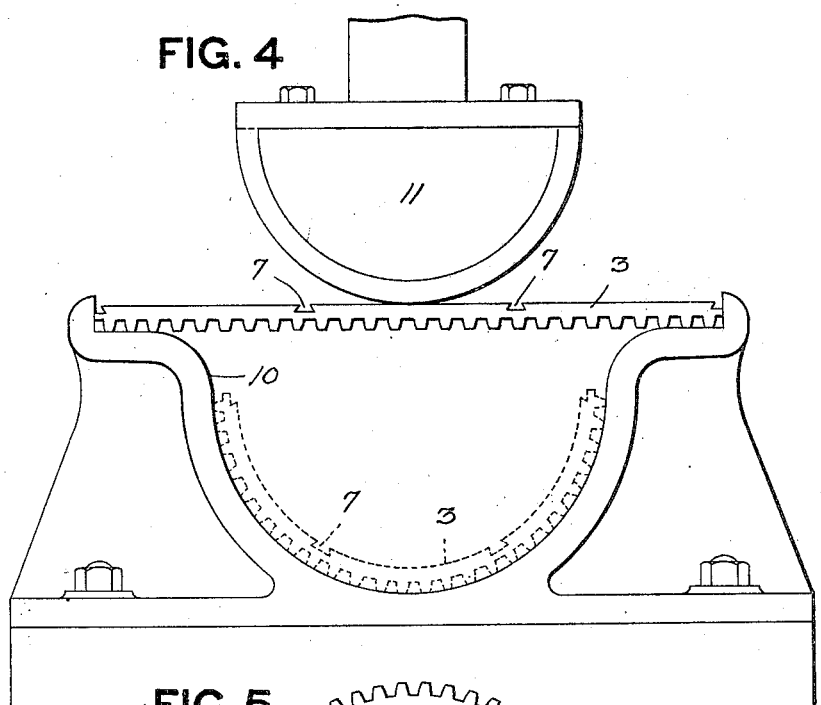
Figure 5:
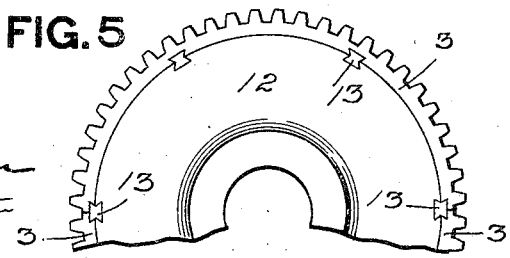

In the accompanying drawings, Figure 1 is a diagrammatic view illustrating the manner of forming the bar. Fig. 2 is a similar view showing the manner of forming the teeth thereon. Fig. 3 is a similar view illustrating the forming of seats for holding-keys. Fig. 4 is a similar view illustrating the bending of the toothed bar into a segmental shape, and Fig. 5 is a side view of a portion of a gear formed according to my invention.

The gear-teeth are formed on a part separate from the body of the gear, which toothed part can be straight while the teeth are being formed and afterward bent to the contour of the wheel. The toothed surface therefore will be formed from a rolled or forged bar of some tough metal, such as steel, which can be tempered and hardened. This bar will be formed in any suitable way—such, for instance, as by rolling the same in a suitable grooved mill, as illustrated at 2, Fig. 1. The grooves of the rolls will be of the proper shape to give the desired cross-section to the bar 3. The bar 3 will then be cut into suitable lengths, as indicated at 4, to form the necessary lengths for the gear-faces. These bars while straight will have the gear-teeth cut in the same by any suitable mechanism, but preferably by a multiple-cutter milling-machine, as is shown at 5, Fig. 2, thus cutting all of the teeth on the entire length of the bar-section at a single operation. This can be done very rapidly, thus greatly reducing the cost of the wheel. The bar will also be provided with suitable means or will be suitably shaped, so that it can be secured to the body of the wheel. This may be done either before or after cutting the teeth thereon and even after bending the bar into segmental shape. The holding means may vary within wide limits. In the specific illustration of the drawings the holding means consists of undercut key-slots 7, which will be formed in the face of the bar opposite to that on which the teeth are cut. This may be done by any suitable tool or machinery, such as the shaper illustrated at 8 in Fig. 3. The toothed bar must be bent to the contour of the gear-wheel periphery. This also can be done in various ways and by various forms of mechanism. In Fig. 4 I have illustrated a concave die 10 and a coöperating convex plunger 11 for bending the toothed bar into semicircular shape. Any other suitable form of mechanism may be used for this step of the operation. The bent bar may then, if desired, be tempered and hardened in the usual way, so as to give it greater wearing qualities. It will then be secured to the wheel-body 12 by suitable means, such as the dovetailed keys 13, fitting in the undercut slots in the rim portion and corresponding slots in the periphery of the body. The gear is then ready for use.

It will be observed that by my process all of the gear-teeth on one-half of the circumference of the wheel are cut at a single operation. Also by this process of manufacture the rim portion may be made of rolled or forged steel, which is not only tough and strong, but can also be tempered so as to harden the same, thus giving lasting wearing qualities thereto. The teeth being machine-cut are as perfect as can be made by machinery. The process is such, however, that these teeth are formed very expeditiously and cheaply.

While in the drawings I have illustrated the formation of one-half of the toothed rim of the gear in a single bar, it will be understood that the inventtion is not limited in this particular, but any desired segmental portion of the gear-periphery may be formed from a single bar. It will also be understood that the form of the teeth may be varied and instead of a straight spur-gear the teeth may be formed on a bevel, so as to form a bevel or miter gear. All such modifications are within the scope of my invention as claimed. The size of the gear can of course be varied widely, so as to include what are commonly called "pinions."

What I claim is—

1. The method of forming toothed faces for gears, which consists in taking a straight bar, cutting teeth in the same, and thereafter bending the bar to curved or circular shape.

2. The method of forming toothed faces for gears, which consists in taking a straight bar, cutting teeth thereon simultaneously for the whole length thereof, and thereafter bending the bar to curved or circular shape.

3. The method of forming toothed faces for gears, which consists in taking a steel bar, cutting teeth in the same, thereafter bending the bar to curved or circular shape, and then tempering the same.

In testimony whereof I, the said HUGH Y. B. DUFF, have hereunto set my hand.

HUGH Y. B. DUFF.

Witnesses:
ROBERT C. TOTTEN,
G. C. RAYMOND.